United States Patent [19]

Vosseler

[11] 3,726,080

[45] Apr. 10, 1973

[54] CONTROL APPARATUS FOR AN ELECTRIC TIMEPIECE

[75] Inventor: Gerhard Vosseler, Basel, Switzerland

[73] Assignee: Mueller & Co. A.G., Oberdorf, BL, Switzerland

[22] Filed: Jan. 14, 1971

[21] Appl. No.: 106,360

[30] Foreign Application Priority Data

Jan. 16, 1970 Switzerland............617/70

[52] U.S. Cl..............................58/23 D, 318/129
[51] Int. Cl.................................G04c 3/02
[58] Field of Search..............58/23 TF, 23 A, 23 R, 58/26, 26 A; 318/329, 330, 451

[56] References Cited

UNITED STATES PATENTS 3,129,370  4/1964  Helfner et al........................318/329
3,470,433  9/1969  Siefert.............................318/330 X

FOREIGN PATENTS OR APPLICATIONS 1,151,427  1/1958  France..............................58/23 A Primary Examiner—Richard B. Wilkinson
Assistant Examiner—Edith C. S. Jackmon
Attorney—Robert E. Burns and Emmanuel J. Lobato

[57] ABSTRACT

Control apparatus of an electric timepiece, particularly a watch, of the type including an electric motor synchronized by an oscillating device and the drive winding of said electric motor being connected in the motor circuit of a transistor, and including a member controlling the timing train of the timepiece, in which apparatus the oscillating device includes a piezo-electric crystal and a piece of magnetic material which when oscillated causes oscillation of said piezo-electric crystal, said magnetic material being disposed in proximity to the circumference of a rotor fixed for rotation with the electric motor and around the periphery of which rotor are disposed one or more permanent magnets so arranged that rotation of the rotor causes said magnetic material and said piezo-electric crystal to be oscillated, said piezo-electric crystal being connected in the control circuit of said transistor so that electric impulses from the oscillating piezo-electric crystal are superimposed on the motor circuit of said transistor.

10 Claims, 3 Drawing Figures

CONTROL APPARATUS FOR AN ELECTRIC TIMEPIECE

This invention relates to control apparatus of an electric timepiece, particularly a watch, of the type including an electric motor synchronized by an oscillating device and the drive winding of the electric motor being connected in the motor circuit of a transistor, and including a member controlling the timing train of the timepiece.

It is known already to have similar control apparatus in which vibrating oscillating reeds, which stabilize the speed of rotation of the motor, are fixed on the rotor of the motor. Such reeds function in a purely mechanical manner and are entirely independent of an electric circuit which includes a pickup winding in the base-emitter circuit of a transistor and an drive winding in the emitter-collector circuit of the transistor.

It is also known to synchronize an electric motor by an oscillating reed disposed not on the rotor of the motor but at the side thereof and in proximity thereto and having a permanent magnet which is magnetically associated with a permanent magnet disposed on the rotor.

It is an object of the invention to improve control apparatus of the type referred to above in as much as the oscillating member not only assures in a purely mechanical manner the stabilization of the speed of revolution of the motor in proportion to the frequency of oscillations of said oscillating member, but wherein the oscillating member also produces synchronizing electric pulses in the control circuit of the transistor in such a manner that an improved stabilization of the speed of rotation of the motor takes place by both mechanical electrical means.

According to the present invention there is provided control apparatus of an electric timepiece, particularly a watch, of the type including an electric motor synchronized by an oscillating device and the drive winding of said electric motor being connected in the motor circuit of a transistor, and including a member controlling the timing train of the timepiece, in which apparatus the oscillating device includes a piezo-electric crystal and a piece of magnetic material which when oscillated causes oscillation of said piezo-electric crystal, said magnetic material being disposed in proximity to the circumference of a rotor fixed for rotation with the electric motor and around the periphery of which rotor are disposed one or more permanent magnets so arranged that rotation of the rotor causes said magnetic material and said piezo-electric crystal to be oscillated, said piezo-electric crystal being connected in the control circuit of said electric transistor so that electric impulses from the oscillating piezo-electric crystal are superimposed on the motor circuit of said transistor.

When the apparatus of the invention is functionning one obtains the advantage in that the motor vibrates the oscillating device by the interaction of the magnets turning with the rotor of the motor and the magnetic material of the oscillating device resulting in that the motor rapidly obtains a constant speed of rotation which depends on the frequency of oscillation of the oscillating device. This frequency is stabilized still further by the synchronization pulses introduced into the control circuit of the motor and produced by the piezo-electric crystal. Also the present invention enables the pickup winding of the motor to be dispenced with, which winding was previously necessary, because its function is assumed by the piezo-electric crystal. However, it is always possible to utilize the present invention with apparatus having a pickup winding of the motor connected parallel or in series with the piezo-electric crystal.

Three forms of the present invention are hereinafter described by way of example only, reference being made to the accompanying drawing, in which.

Figure 1:
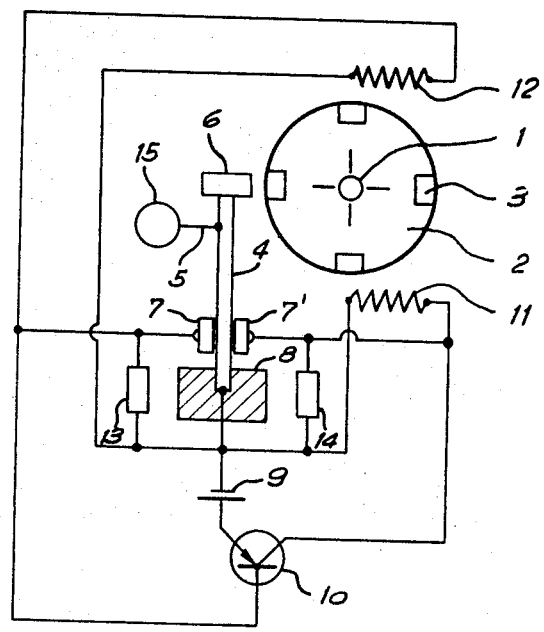
FIG. 1 is a schematic circuit diagram of a first form of the invention.

Referring first to FIG. 1, a rotor 2 having permanent magnets 3 disposed regularly about its circumference is secured on the shaft 1 of a motor. To one side of the rotor 2 and in close proximity thereto is situated an oscillatable member in the form of a metallic reed 4 the lower end of which is embedded in a support 8. Such support, for example, may consist of the mounting plate of a watch or of a stud fixed to such mounting plate. The reed 4 carries at its free end a permanent magnet 6 so disposed as to be in close proximity to the circumference of the rotor 2. Instead of the magnet 6 it is possible to use a piece of soft steel. Attached to the reed 4 is a pawl 5 in the form of a thin wire and the free end of which (lefthand end in FIG. 1) mechanically engages with the teeth of a ratchet 15 which it activates when the member 4 oscillates. This ratchet, or more particularly a pinion carried by its shaft, controls the first wheel off the timing train. On each side of the reed 4 in proximity to the support 8 are secured two small piezo-electric crystals 7, and 7'. These piezo-electric crystals may, for example, be attached to the reed by means of an adhesive which is sufficiently electrically conductive. Thus the metallic reed 4 forms an electrical connection between the two piezo-electric crystals 7 and 7' and functions also as one electrode (the interior electrode) of each of these crystals. Thus the two interior electrodes of the crystals are electrically connected. The opposed surfaces of the two piezo-electric crystals 7 and 7' may also be metallized and be attached to the reed 4 by a substance which is not electrically conductive, the metallic coating on the crystals which acts as electrodes being connected together and to the reed 4 by conductors.

The drive winding 11 of motor 1, a battery 9 and the emitter-collector path of a transistor 10 are connected in series circuit relationship as shown in FIG. 1. The pickup winding 12 of motor 1, the battery 9 and the emitter-base path of transistor 10 are also connected in series circuit relationship. The piezo-electric crystals 7 and 7' are connected in parallel across the windings 12 and 11 respectively of the motor. The base of the metallic reed 4 is connected to the negative pole of the battery 9.

Connected in parallel across the two electrodes of each of crystals 7 and 7' are resistors 13 and 14 respectively. The characteristics and type of the transistor 10 determine if the two resistors 13 and 14 are necessary, or if only one of these is necessary, or if neither are necessary.

When the motor 1 is connected to the battery 9 and commences to rotate in one direction or the other, the reed 4 will be caused to oscillate by the magnetic interaction between the magnets 3 of the rotor 2 and the magnet 6 of the reed. After a short time the reed begins to oscillate with a frequency determined by the material of which it is constructed and by its dimensions and the motor begins, for example after one second, to rotate with a fixed speed of rotation corresponding to the frequency of oscillation of the reed 4.

The stabilization of the speed of rotation of the motor, the value of which is determined by the frequency of oscillation of the reed 4, is expedited and improved by the impulses produced by the frequency of the mechanical oscillations of the reed 4 which impulses are received by the control circuit including transistor 10 and which are superimposed on the pulses produced in he pickup winding 12 by the magnets of the rotor 3.

The circuit of FIG. 1 has the advantage that the metal reed 4 may consist of an alloy having a very small coefficient of temperature, for example the reed may be made of an well known alloy sold under the name NIVAROX the temperature coefficient of which is practically zero. The piezo-electric crystals 7 and 7' may be relatively small which reduces their cost and also reduces their sensitivity to changes of temperature to practically negligible proportions. However, it is possible to form the reed 4 of a suitable synthetic plastic material instead of metal. When the reed 4 is formed of plastic material the electrical connections between the two opposed, internal surfaces of the piezo-electric crystals 7 and 7' may be affected by providing a metallic layer on the reed 4 to which layer the negative pole of the battery 9 is also connected.

Figure 2:
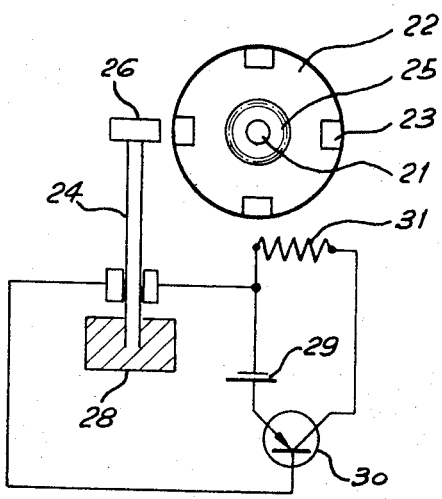
FIG. 2 is a schematic circuit diagram of a second form of the invention.

Referring now to FIG. 2, in which the reference numerals 22, 23, 21, 31, 26, 28, 29 and 30 indicate the same parts or members as the reference numerals 2, 3, 1, 11, 6, 8, 9 and 10 respectively of FIG. 1, the reed 4 (FIG. 1) is replaced by a piezo-electric crystal 24 embedded at its lower end in the support 28. The upper, free end of the crystal 24 carries a permanent magnet 26 disposed in close proximity to the magnets 23 situated around the circumference of the rotor 22 of the motor. The shaft 21 of the rotor carries a pinion 25 which serves to actuate the first wheel of the timing train. In this embodiment of the invention also, the drive winding 31 of the motor, the battery 29 and the emitter-collector path of the transistor 30 are arranged in series circuit relationship. By means of metal contacts 32 and 32' the crystal 24, the battery 29 and the emitter-base path of the transistor 30 are also connected in series circuit relationship. This embodiment of the invention functions without a pickup winding for the motor because the control impulses necessary for feeding to the transistor 30 are produced by the crystal 24. In the arrangement of FIG. 2, it is equally possible, but in no sense mandatory, to connect the field winding of the motor in parallel or in series with the crystal 24 in a manner somewhat similar to that shown in the embodiment of FIG. 1 and FIG. 3 respectively.

In this embodiment of the invention the member 24 instead of being a crystal may also consist of a reed of metal or plastic embedded in the support 28 and as referred to in connection with FIG. 1. If the member 24 consists of such a metal or plastic reed, a crystal would be fixed to one or the other side of such reed.

Given a certain frequency of oscillation of the member 4 or 24, the number of revolutions per unit time of the rotor 2 or 22 naturally depends on the number of magnets 3 or 23 disposed around the circumference of the rotor. If all the magnets of the rotor have like poles directed outwardly therefrom, the magnet 6 or 26 will be always attracted or repelled by the magnets 3 and 23 respectively when the corresponding rotor rotates. Alternatively, if the magnets 3 and 23 are arranged so that each alternate magnet presents a different pole towards the exterior, the magnets 6 or 26 will be alternatively attracted and repelled by rotation of the corresponding rotor.

Referring again to FIG. 2, between the pinion 25 on the shaft of the rotor 21 and the timing train may preferably be disposed a known clutch arrangement of the type used in watches having automatic winding and which clutch assures that the timing train will be always actuated in same sense independent of the direction of rotation of the motor. Also, such an arrangement effects economies in that accessories for assuring that the motor always rotates in the same direction can be dispensed with. Referring back to the embodiment of FIG. 1, the pawl 5 and the ratchet 15 are able to be arranged in such a manner that at the commencement of oscillation of the reed 4 the ratchet 15 will be actuated always in the same direction. In this embodiment also one may include a clutch arrangement of the type mentioned above between the ratchet 15 and the timing train.

By way of example only the dimensions of various members of the embodiment according to FIG. 1 may be as follows. The reed 4 may have a length of 18 mm and a thickness of 0.2 mm; the crystals 7 and 7' may have a length of about 5 mm when the diameter of the rotor 1 is about 10 mm. Therefore, the various members of the apparatus according to the invention take up very little space and are particularly suited for use with watches. With a battery voltage of 1, 25 V the electric motor only consumes a current of the order of 8 to 10 microamps, assuring that a watch will have a very great power reserve.

A device according to the invention permits, therefore, the fabrication of timepieces, particularly watches, in a simple and economic (inexpensive) manner yet in a manner which imparts a high working precision to such timepieces.

The invention is not limited to the two embodiments described above and variations may be made in these embodiments without departing from the scope of the invention as defined herein.

Figure 3:
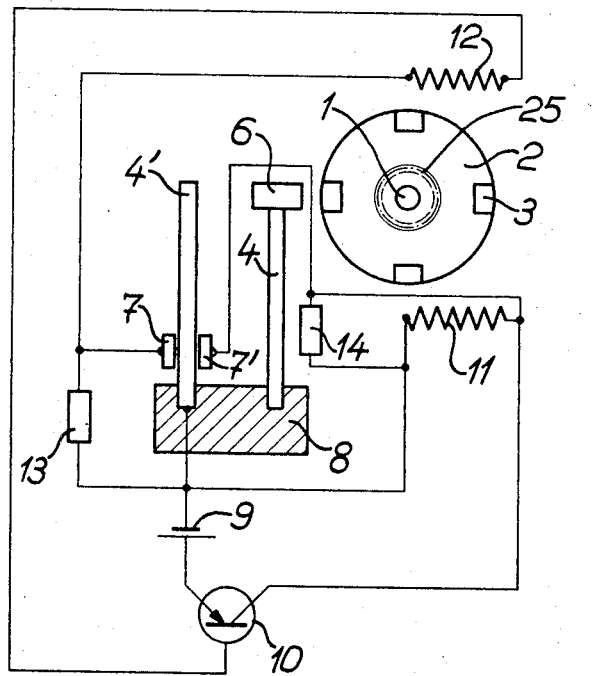
FIG. 3 is a schematic diagram of a third form of the invention.

For example, a second reed may be embedded in the support 8 or 28 and purely resonant mechanical oscillations will be imparted to such reed by the intermediary of the material of the support 8 or 28. With such an arrangement the stability of the oscillations and in consequence their synchronization effect will be improved still further. An embodiment comprising a second reed 4' is shown in FIG. 3, which is otherwise quite similar to the embodiment of FIG. 1, corresponding parts of FIG. 3, have the same reference numbers. The controlling member for the timing train is formed by a pinion 25 as in FIG. 2, and the pick-up winding 12 is connected in series circuit relationship with the crystal 7. The first mentioned reed 4 carrying a magnet 6 or a piece of soft steel will be caused to oscillate by the rotor 2 of the motor while the second reed 4' may take the form of piezo-electric crystal or carries crystal 7 and 7' and serves as the transmitter of the control impulses. Equally, the possibility is foreseen of having two resonantly oscillatable reeds each carrying a piezo-electric crystal, one such crystal (such as that of FIG. 1) being connected in the control circuit and the other such crystal being connected in the motor circuit of a transistor ; in this arrangement it is only necessary that one reed carries a magnet or piece of soft steel.

What is claimed is

1. Control apparatus of an electric timepiece, particularly a watch, of the type including an electric motor synchronized by an oscillating device and the drive winding of said electric motor being connected in the motor circuit of a transistor, and including a member controlling the timing train of the timepiece, in which apparatus the oscillating device includes a piezo-electric crystal and a piece of magnetic material which when oscillated causes oscillation of said piezoelectric crystal, said magnetic material being disposed in proximity to the circumference of a rotor fixed for rotation with the electric motor and around the periphery of which rotor are disposed one or more permanent magnets so arranged that rotation of the rotor causes said magnetic material and said piezo-electric crystal to be oscillated, said piezo-electric crystal being connected in the control cricuit of said transistor so that electric impulses from the oscillating piezo-electric crystal are superimposed on the motor circuit of said transistor.

2. Apparatus according to claim 1, in which said motor has a pickup winding and in which said piezoelectric crystal is connected in parallel with said pickup winding of the motor.

3. Apparatus according to claim 1 including a battery in series with said piezo-electric crystal and with the emitter-base path of said transistor, the drive winding of the electric motor being connected in series with said battery and with the emitter-collector path of said transistor.

4. Apparatus according to claim 1, in which said motor comprises a shaft and in which said member controlling the timing train of the timepiece includes a pinion secured on the shaft of the electric motor.

5. Apparatus according to claim 1, in which said member controlling the timing train of the timepiece includes a ratchet and a pawl mounted for oscillation with said oscillating device and mechanically cooperating with said ratchet.

6. Apparatus according to claim 1, in which said oscillating device comprises an elongated piezo-electric crystal having said magnetic material connected to a free end thereof and including a support for said crystal embedded in said support.

7. Apparatus according to claim 1, in which said oscillating device comprises an elongated reed, a support in which one end of said reed is embedded, said reed having said magnetic material connected to a free end thereof, said piezo-electric crystal being secured to one side of said reed.

8. Apparatus according to claim 7, including a second piezo-electric crystal attached to said reed opposite to said first mentioned piezo-electric crystal, said second piezo-electric crystal being connected in parallel with the drive winding of the electric motor.

9. Apparatus accroding to claim 1, including a second oscillating device comprising an elongated reed embedded in the same support as the first mentioned oscillating device so as to vibrate in resonance therewith.

10. Apparatus to claim 1, in which said motor comprises a pickup winding and said piezo-electric crystal is connected in series with said pick-up winding of the motor.

* * * * *